United States Patent [19]

Cresap

[11] 4,351,869

[45] Sep. 28, 1982

[54] SINTERED POLYMER MOLDINGS AND COMPOSITES HAVING ALTERED CROSS SECTION(S): FLUID COMPACTING AND SINTERING PROCESS AND APPARATUS FOR MAKING SAME

[76] Inventor: Charles N. Cresap, Silver Mountain, Millerton, N.Y. 12546

[21] Appl. No.: 160,184

[22] Filed: Jun. 17, 1980

Related U.S. Application Data

[63] Continuation-in-part of Ser. No. 901,625, May 1, 1978, abandoned, which is a continuation-in-part of Ser. No. 585,347, Jun. 9, 1975, abandoned, which is a continuation-in-part of Ser. No. 173,601, Aug. 20, 1971, abandoned, which is a continuation-in-part of Ser. No. 676,674, Oct. 16, 1967, abandoned.

[51] Int. Cl.³ .................... B32B 3/04; B32B 27/00; B29C 17/06; B29D 9/04
[52] U.S. Cl. .................... 428/121; 428/156; 428/164; 428/170; 428/218; 428/422; 264/314; 264/331.14; 264/500; 264/510
[58] Field of Search .......... 264/500, 510, 314, 331.14; 425/405 R; 428/218, 121, 156, 170, 164, 422

[56] References Cited

U.S. PATENT DOCUMENTS

| | | |
|---|---|---|
| 2,644,198 | 7/1953 | Crawford . |
| 2,689,380 | 9/1954 | Tait . |
| 2,691,814 | 10/1954 | Tait . |
| 2,745,139 | 5/1956 | Burton . |
| 2,851,725 | 9/1958 | Bauer . |
| 2,929,109 | 3/1960 | Cresap . |
| 2,936,301 | 5/1960 | Thomas et al. . |
| 2,955,973 | 10/1960 | Smith . |
| 2,972,784 | 2/1961 | Shonka et al. . |
| 2,976,093 | 3/1961 | Reiling . |
| 3,008,601 | 11/1961 | Cahne . |
| 3,010,950 | 11/1961 | Thomas . |
| 3,015,855 | 1/1962 | Merkel . |
| 3,021,567 | 2/1962 | Ranalli . |
| 3,048,537 | 8/1962 | Pall et al. . |
| 3,060,517 | 10/1962 | Fields . |
| 3,068,513 | 12/1962 | Chaffin . |
| 3,126,311 | 3/1964 | Harris . |
| 3,215,908 | 5/1966 | Wilenius et al. . |
| 3,235,637 | 2/1966 | Hoffman et al. . |
| 3,262,834 | 7/1966 | Abell et al. . |
| 3,391,221 | 7/1968 | Gore et al. . |
| 3,421,972 | 1/1969 | Cromwell et al. . |
| 3,431,160 | 3/1969 | Usui et al. . |
| 3,444,021 | 5/1969 | Bilbe . |
| 3,459,213 | 8/1969 | Schenck, Jr. et al. . |
| 3,574,805 | 4/1971 | Hatch et al. . |
| 3,582,451 | 6/1971 | Stolki et al. . |

*Primary Examiner*—William R. Dixon, Jr.

[57] ABSTRACT

This invention is concerned with high density compacted and sintered polymer articles which previously could not be made entirely non-porous to liquid. It was inevitable, in an article with different parts, that frictional considerations in pressing one part would materially differ from those of another with the practical result that uniformity of density, throughout the article, could never be achieved. Fortuitously, for purposes of making various different parts of an article void free, the density values for each part need not be substantially all the same, but instead need only be raised above a predetermined threshold value.

An object of this invention is the preparation of physically dense objects of sintered polymer with multiple parts, such as with abruptly varying cross section, which are uniformly void-free throughout, and of everywhere "theoretical" (reguline) density.

Present application discloses simultaneous fluid pressing and sintering of sinterable polymer into high density shapes with multiple parts, recessed sections, and/or varied cross section(s), or attaching and/or adhering the polymer to various rigid materials and/or surfaces. By constraining heated fluid to deform thin sheet in contact with sintering polymer pieces, masses, or assembly, it has been found that the sintered polymer can be formed in multiple parts, of difficult and distributed shapes, recessed and varied cross section, etc., or adhered and/or interlocked to rigid material or surface(s) in faultless and void-free quality, everywhere of highest density.

Composites with glossy and distributed surface, and undulating in polymer shape, are consolidated with rigid material the void-free combination benefitting from their respective and distinct individual properties and contours. Formed thin sheet or recessed section moldings per above may be combined integrally with the composites while still retaining void-free quality etc. throughout.

Apparatus for producing the moldings and composites consists of one or several sheets of thin material sealed inside a split container composed of corresponding container sections and possible additional ones. Various combinations of single and multiple-diaphragm sets can be assembled for simultaneous fabrication of moldings or composites.

20 Claims, 16 Drawing Figures

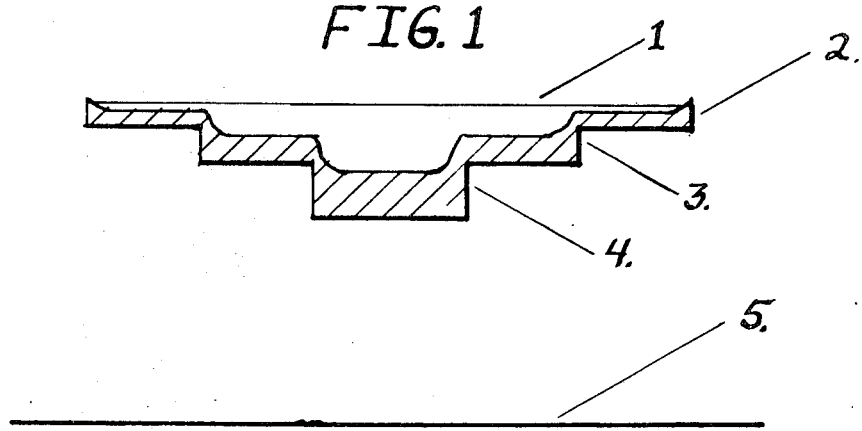
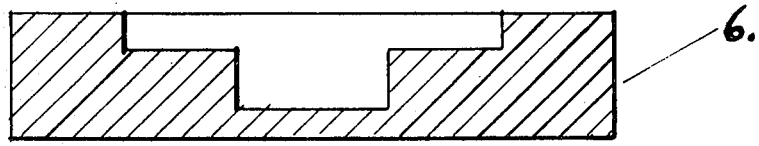

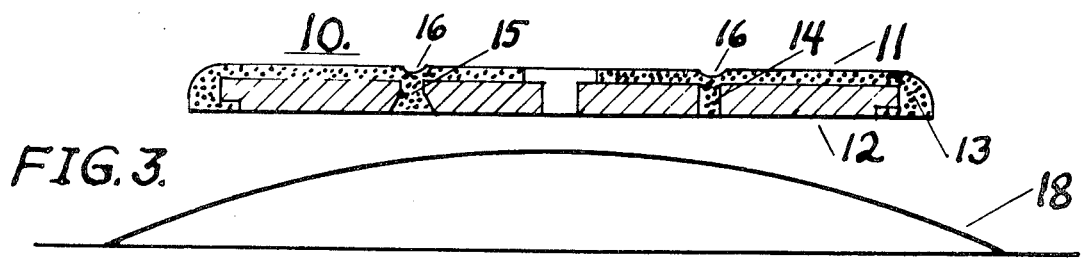
FIG. 3.
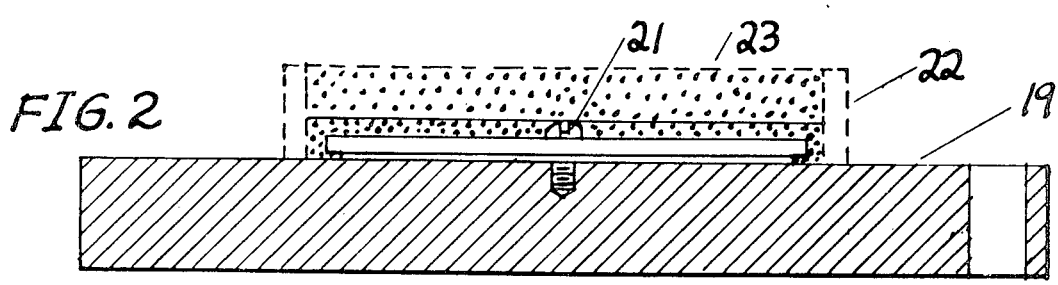
FIG. 2.
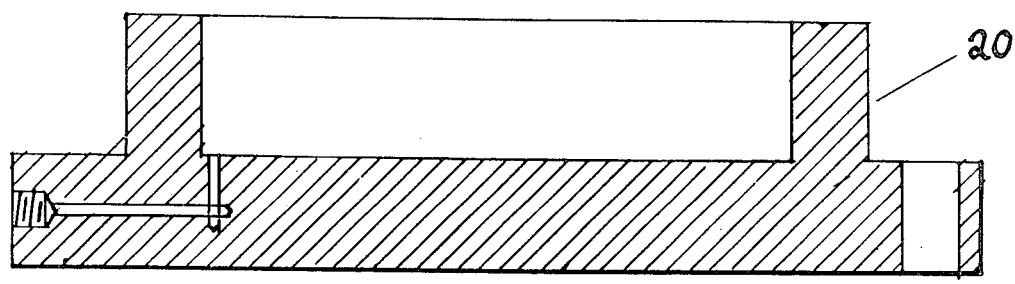
FIG. 4a.
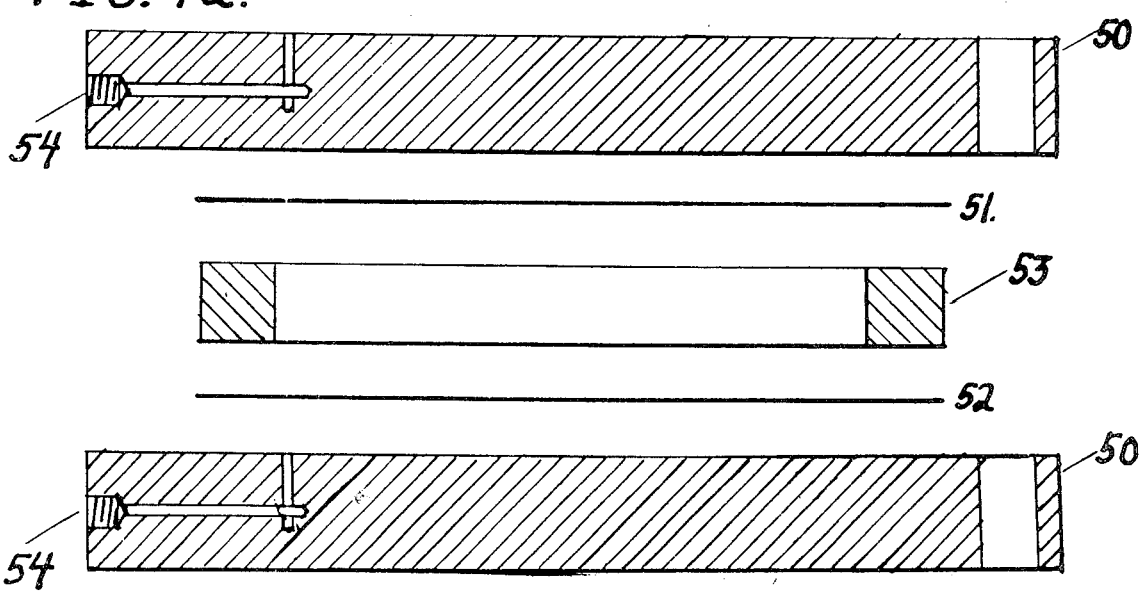

FIG.4b.
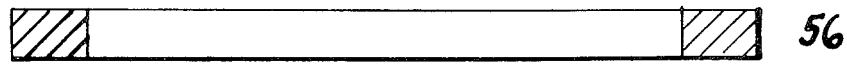
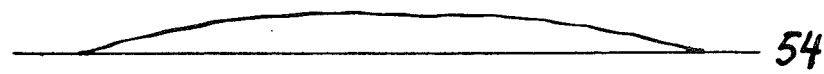
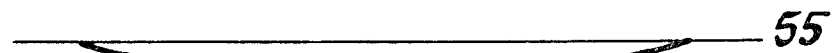
FIG.5
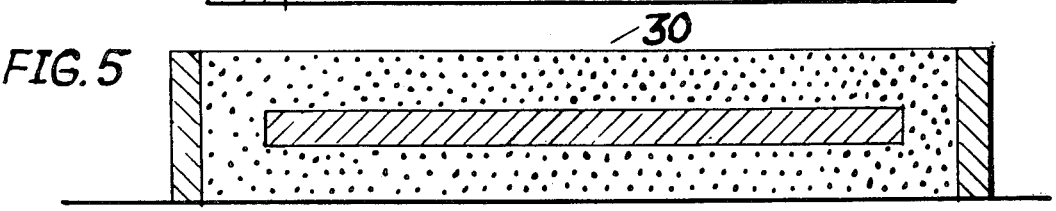
FIG.6
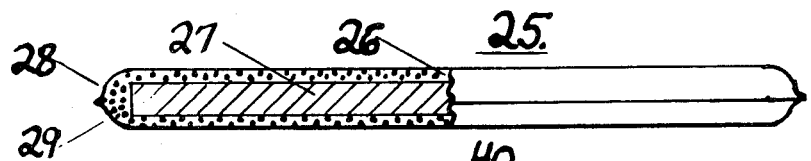
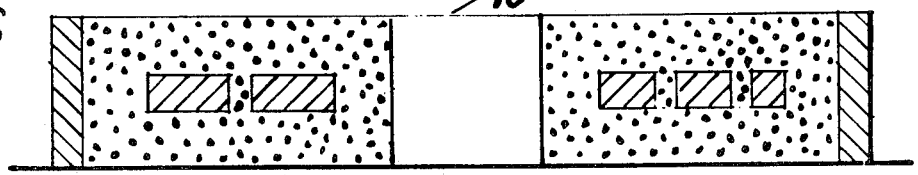
FIG.7
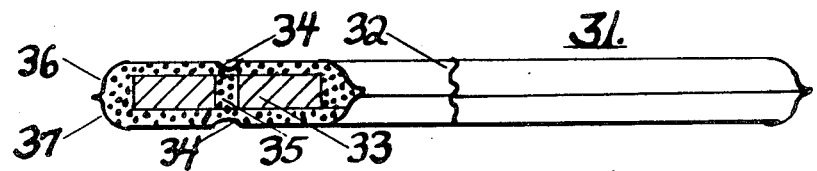
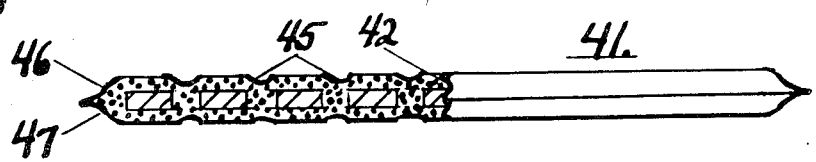

FIG.11
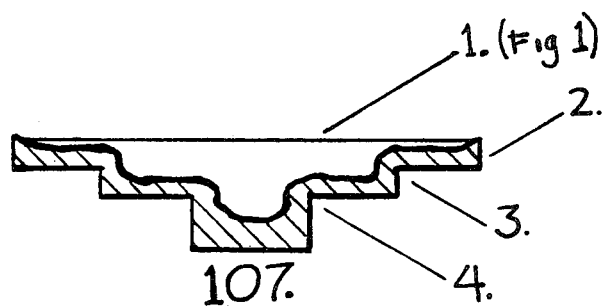
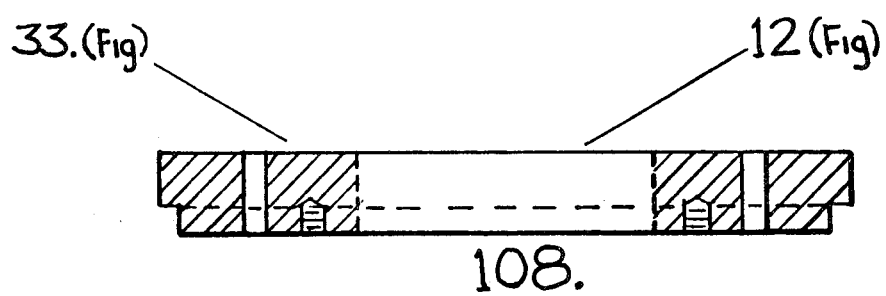
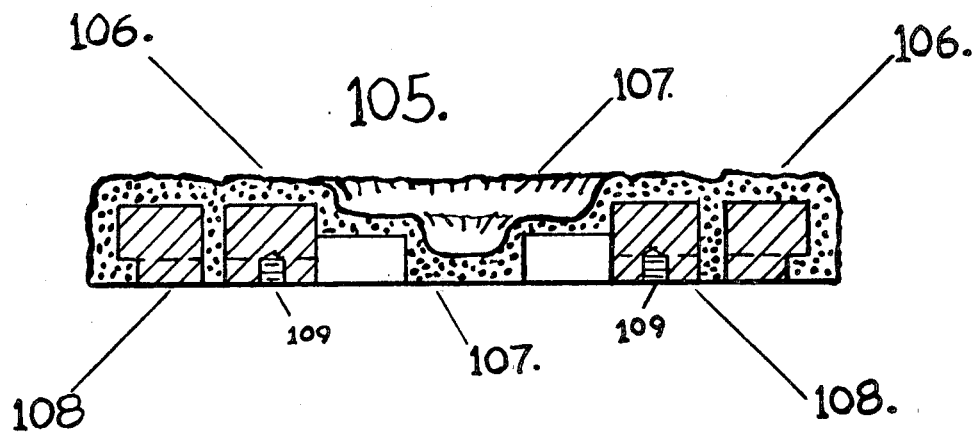

SINTERED POLYMER MOLDINGS AND COMPOSITES HAVING ALTERED CROSS SECTION(S): FLUID COMPACTING AND SINTERING PROCESS AND APPARATUS FOR MAKING SAME

This application is a continuation-in-part of my application Sintered Polymer Moldings and Composites Having Altered Cross Section(s): Fluid Compacting and Sintering Process and Apparatus, Ser. No. 901,625 filed May 1, 1978; which is a continuation-in-part of my application Sintered Polymer Recessed-Sectioned Moldings and Composites; deformed Diaphragm Process and Apparatus for Making Same, Ser. No. 585,347 filed June 9, 1975; which is a continuation-in-part of my same titled application 173,601 filed Aug. 20, 1971; which is a continuation-in-part of my application Sintered Polymer Recessed-Section Moldings and Composites; Deformed Metal Foil Process and Apparatus for Making Same Ser. No. 676,674 filed Oct. 16, 1967 all abandoned.

FIELD OF INVENTION

This invention deals with fabricating special multipart shapes, composites, and combinations from sinterable polymer particles, pieces, or assembly where difficulties arise in consolidating and sintering the polymer uniformly and completely throughout the final product in highest density. Any nominally rigid solid polymer material, of stable and high molecular weight, by itself or mixed with other substances, capable of being subdivided into particles, pieces, or small masses which physically develop mutual cohesion from pressure, and which upon appropriate heating, lose identity to become merged irreversibly into a self-sustaining, non-frangible solid mass, with physical reduction of polymer free surface, is considered to be sinterable polymer as used herein. Such type synthetic or other plastic can be consolidated and sintered into strong, properly densified, and void-free sintered products, as illustrated in the drawings for example, by the method and apparatus of the invention. Some aspects of it are the development of hot pressing apparatus and technique by which sheet material usually becomes permanently deformed and shaped in contact with polymer particles or pieces in what may be tacky condition to distribute the plastic in special shapes, or adhere or attach it to rigid material. By the suggested procedures, and using described devices, sintered polymer composites and other shapes, or combinations, can be produced with entirely uniform and void-free quality, having normally glossy and distributed surface and undulating shape, never previously made.

DESCRIPTION OF THE PRIOR ART

Early experiments were made by Cresap to form round shallow vessels from poly tetra fluoro ethylene flat sheet by blow forming at high temperature with the sheet in the gelled state. Draws up to about one radial depth could be obtained without frequent rupture of the fragile gell. With release of pressure, however, or reheating to gell temperatures, the shallow vessel would spontaneously revert once more to its initial flat configuration. This phenomenon, inherent with high molecular weight linear polymers, is called plastic memory. From initial solid formation during polymerization on through making an article by compaction, sintering and cooling, the physical effects of ultra long molecular reorientation and readjustment are readily observed, sometimes partial or delayed and on other occasions substantially completed.

Shonka et al (U.S. Pat. No. 2,972,784) encapsulate small bar magnets with PolyTetraFluoroEthylene, (TFE) polymer (PTFE), by cold pressing and free sintering using a sliding rigid mold and oven, see FIGS. 6 and 9. This method is limited to small objects, for as further discussion of Bauer (U.S. Pat. No. 2,851,725) indicates below, the single stroke core pin 36 FIG. 6 of the Shonka patent cannot accurately compress the thinly covered middle along with the more thickly covered ends FIG. 10 in this mold unless these thicknesses are essentially not much different. This is particularly true under Shonka's express condition, which is applicable to all solid preforming operations, to prevent slippage flaws, "without substantial flow" of or between powder particles. Furthermore, experience has shown that in free-sintering PTFE over a rigid inside core, its overall length need hardly exceed more than several inches before fractures, porosity, and usually complete breakage occurs as sintering and cooling effects become increasingly more pronounced relative to a differently or non-shrinking core.

Reiling (U.S. Pat. No. 2,976,093) describes a sintered PTFE coating attached to rigid reenforcing member FIGS. 6, 8 and 18 of the patent. Unfortunately, he offers no insight, observation, or leastwise any suggestion how to improve on or eliminate the quality problem arising from making more than one thickness in the same compacted and sintered polymer molding. This is to say, the thicker portions, in Reiling's composites, being subject to the same unit pressure as other portions during performing "are compacted to a lesser degree and are therefore less dense and have a higher void content than other portions," Reiling col 1 lines 56–61, also FIGS. 5 and 7.

The thickness-porosity problems of Shonka and Reiling are of profound proportions. Technical papers on PTFE and ultra high molecular weight polyethylene compare the processing methods of these type polymers to those used for powdered metals and ceramics. And on account of particle to particle friction, and particle friction against rigid wall, it has long been apparent, in the dense type compacted and sintered metal and ceramic products, that highest (reguline) density, as well as uniformity of density throughout a fabricated article, can only be achieved under very special and rare conditions, significant variation throughout taking place most generally.

For example, Kingery, Bowen and Uhlman, *Introduction to Ceramics,* 1976, page 10 2nd para state as follows "one limitation is that for a shape with high length to diameter ratio, the frictional forces of the powder, particularly against the die wall, lead to pressure gradients, and a resulting variation of density within the piece." And Sheinhart, McCullough and Zambrew, *Journal of Metals* May 1954 page 515, in article Method for Evaluation of Lubricants in Powder Metallurgy, say the following "As one progresses through the wall section of any pressed part, during the pressing operation, the pressure applied to the die falls off dramatically throughout the part. This is, in large measure, caused by part geometery—whenever section thickness changes, or when a vertical wall changes direction (example to a horizontal from vertical), the friction between wall and powder particles changes dramatically."

Bauer (U.S. Pat. No. 2,851,725) has noted there are serious difficulties in trying to mold parts made up of sections with different dimensions. His floating piston mold (see FIGS. 4 and 5 of this patent) is capable of pressing cylindric and prismatic objects with a common axis of compression. The device allows each compressing piston a variable stroke whose length is determined by the amount of material placed above it along the axis of compression. The statement immediately above of Kingery etc., is applicable to Bauer's prismatic molding portions; however, on account of die wall friction each part of the molding will exhibit corresponding pressure decay, and consequent density impairment, the figures becoming lower with increasing distance away from each compressing piston surface.

Although variability of stroke is rather important, it is only one of the factors that must be overcome in filling out and achieving sintered uniformity and highest density in more difficultly sectioned multi-part shapes. Beakers for example, fluid pressed cold from PTFE, fail to achieve as high sintered density between sidewall and bottom (intersection) as that found respectively in the portions themselves, see Sheinhart, McCullough and Zambrew immediately above. What is evident from the art, and unmistakeable by the failures set forth in examples 1, 2, 3 and 5 (see Summary) is that, even under circumstances as favorable as Bauer, with cold pressing using conformal surface and variable stroke, there are many difficult sections as discussed herein (see drawings) that cannot be successfully made on account of friction arising between polymer pieces etc., and against rigid surface of mold or matrix.

SUMMARY OF THE INVENTION

Part of this invention relates to making an object from sinterable polymer comprised of more than one part, such as plain and shoulder portions, a shape where the cross section changes abruptly in thickness, or at a discrete angle etc. Some such changes are characterized as independent projections or depressions of polymer cross section incorporated into its overall mass and bulk. Sinterable polymer herein is one or a blend of several type compatible polymeric substances, of high and stable molecular weight, alone, with inert fillers, or mixed with other ingredients, that when subdivided into a plurality of particles, pieces, small or partially compressed masses, having large free surface (unglazed area to ensure cohesion) are able to cohere and agglomerate physically as a result of pressure, and which when heated below the major constituent melting point, or near or above its transition temperature, maintain shape with the subdivided forms losing identity, by reduction of free surface and physically diffusing together to become irreversibly sintered into a strong, nominally rigid, and no longer frangible solid homogenous sintered mass. By previous methods, it has not been possible to mold an article with more than one part, and at the same time achieve in all attached portions a uniform, faultless and void-free high quality comparable with that of the simplest portion. When heated fluid under pressure is applied to polymer pieces at or above their sintering temperatures, the steps of compaction and sintering, always separately and individually performed in molded and sintered polymer products of the prior art, are simultaneously merged becoming one and the same. Pore generation by polymer chain readjustment, disorientation from close molecular juxta position at contact surfaces, and other linear high polymer dimensional effects of plastic memory are eliminated or greatly reduced. By containing fluid under pressure, and heated near or above the polymer transition temperature, or near but below its fusion point (as may be applicable), on thin sheet, a conformal surface is produced by the deforming sheet that faultlessly, and without creating voids or fractures, distributes and shapes the coalescing particles or pieces into recessed section etc. above described.

Another part of the invention is to cause sintering polymer to become adhered to surfaces, projections, or depressions of rigid material by application of hot fluid under pressure, sometimes against a deforming thin sheet which distributes and properly densifies the polymer throughout its entire void-free molded mass. In addition, the permanently deformed thin sheet strongly adheres to, and faithfully reproduces the undulating shape and distributed polymer surface to which the minutely conforming and congruently shaped sheet becomes attached. To take advantage of the reenforcement, the deformed sheet offers a soft hot molding, the former should not forcibly be peeled away from the latter until cooling has well progressed.

A further object of this invention is to make composites based on these shapes of void-free sintered polymer, which interlock and/or adhere it to rigid matrix material, in undulated shape and normally glossy, reflective surface. Where the thin sheet material may be desired adhered to the composite, the resulting unified aggregation consists of more than two elementary constitutents in void-free union, no reason existing for forcible removal of the adhered sheet.

Apparatus to carry out the invention consists of a split container and one or several diaphragms. In a certain embodiment one part of the container retains the polymer (and matrix if used) and the other part seals the margins of the sheet in order to hold the fluid on the diaphragm. In another type only diaphragms may be used in contact with the polymer (and matrix if present), the fluid being contained on each diaphragm simultaneously with the others. Different combinations of each may be put together for the multiple production of several objects, two diaphragms being placed back to back over a single container part, or as may otherwise be suitable.

By such apparatus and method it has been possible to mold sintered polymer attached to rigid material to make a faultless and void-free composite with undulating shape, distributed and normally glossy surface. Such a composite, or molding, is of uniformly perfect quality throughout, in all its parts, being entirely free of voids, liquid permeating porosity, incipient and actual flaws, fractures, crazes etc. Its fluid pressed parts, immediately obvious to the skilled observer, are relatively undulated and gently rounded, seldom truly planar-exactly flat, nor uniformly curved at a constant radius. Their normal surface texture is reflective and glossy, and never retains the granular surface analagous to fine sandpaper (like moldings which are cold pressed). Surface conditions of thin sheet and rigid mold are reproduced in the molding surface (in mirror image). Contamination by dust, dirt, corrosion, heat decomposed deposits, or sizes are unavoidably impressed and baked into the sintered polymer to discolor its surface and mar its usual texture. The composites provide a combination of physical properties that neither constituent could have alone. Significant adhesion results between matrix (rigid surface) and polymer by close molecular juxta-position and from surface roughness. Several polymer layers may be consolidated. Adhesion may be supplemented by mechanically interlocking the polymer and rigid material with independent projecting part systems involving properly sintered and densified polymer. Thus the polymer may be attached to one matrix (or several) by part extensions of polymer, into the matrix, by extensions around an extremity, by abruptly thicker polymer extensions, or by interlocking sections with discrete angular changes or curvature. Generally speaking, the interlocking of sintered polymer parts to rigid matrix material involves shaping projections outwardly from the mass or bulk polymer which extend into congruently contoured and independent depressions within the matrix material. Of course, the rigid material may have the projected sections, instead of depressions, in which case corresponding and congruent depressions are formed within the bulk of the sintered polymer. Variation of projecting part cross section may be effective to increase and make more effective the interlocking, curvature, complete or partial reversal having corresponding benefits.

BRIEF DESCRIPTION OF DRAWINGS

FIG. 1 is a shouldered article 1 made with metal foil 5 and rigid mold 6. The apparatus is housed in FIG. 2 split container 19 and 20.

FIG. 3 is a single sided composite 10 consisting of distributed polymer 11 and rigid matrix 12.

FIG. 2 shows the apparatus for making composite 10 FIG. 3 which includes a formed foil 18 FIG. 3 and split container 19 and 20 FIG. 2.

FIG. 4a presents split container 50, 50 and 53 with double flat foils 51 and 52. In another form FIG. 4b split container, ring comprises two halves 56 and 56, of the one ring 53, which uses two formed foils 54 and 55 instead of the flat one 51 and 52.

FIGS. 5 and 5a illustrate a totally covered circular composite 25 consisting of polymer surface layer 26 and steel disk 27. It was made from preform assembly 30 using split container 4b and concave foils 54 and 55.

FIGS. 6 and 6a give a completely covered torous (annular ring) 31 with polymer part 32 and annular ring 33. The polymer assembly 40 was used to make torous 31 by processing in double foil apparatus FIG. 4a with flat foils 51 and 52.

FIG. 7 shows a sieve plate blank 41 with totally encompassing polymer cover 42 on matrix 43. The blank was shaped with the apparatus of FIG. 4b.

FIGS. 10 and 10a show a composite 95 with polymer interlocked to rigid matrix 90 via punched section 91 and projections 92 and 93, with undulations of surface 96 and 96a.

FIGS. 11 and 11a show molding-composite combination 105 in cross section, composed of recessed molding 1 with shoulders 2, 3, and 4, and annular ring 33. Molding 107 and polymer attachment 106 are shown integral and continuous, the latter being attached and adhered to ring 108, forming the combined composite 105 (undulated polymer contour is indicated by hand drawn line, upper extremity of polymer cross section 106). Annular ring 33 was adopted from disk 12; spacer ring 111 was needed for molding per 19 FIG. 2.

DESCRIPTION OF EMBODIMENTS

Figure 8:
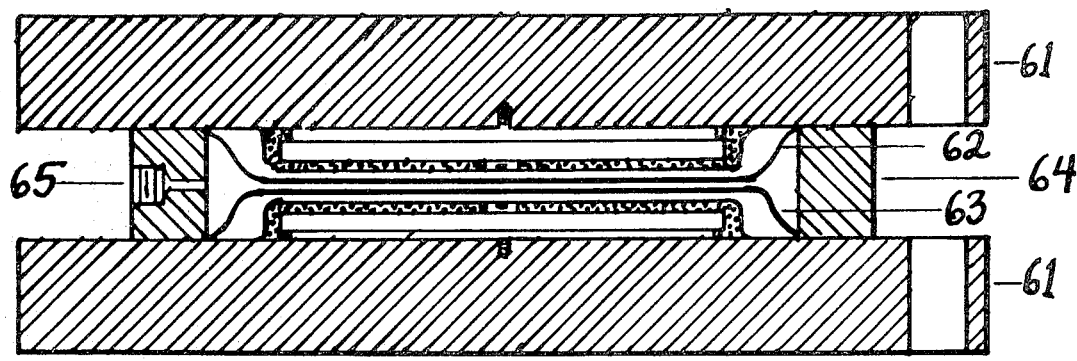
FIG. 8 demonstrates a back to back assembly of two single diaphragm devices FIG. 2.

It is an object of the invention to mold sinterable polymer into an article with different parts such as having at least one section with abruptly altered thickness, one or more sudden change of direction, or a combination of thickness and directional change of cross sectional features, while maintaining uniform and void-free sintered quality throughout the entire article. The multipart geometrical sections or portions referred to herein, sometimes loosely referred to as shoulders or recessions, may be characterized in some instances as having at least one projection or depression made integral with the rest of the sintered polymer part body or mass.

By sinterable polymer is meant any high molecular weight solid capable of self diffusion and becoming what may be described as tacky at suitable elevated temperature, while still retaining shape and chemical stability, which may be constituted as subdivided particles, pieces, small or partially compacted masses, such subdivisions developing cohesion with one another as a result of compacting pressure, and becoming irreversibly drawn together by heating, with large reduction of free surface, losing their individual identity, to form a single strong and dense solid mass, of no longer frangible nature. It is customary for sinterable polymer to be prepared in the form of one pure component, or a compatible blend of several high polymers. Sometimes inert fillers may be added, coloring, fire retardents, lubricant or other ingredients with specific properties, etc., reducing cost or achieving other purposes.

Another object is to adhere sintered polymer to rigid material or thin sheet.

Still another purpose is to prepare single or combined composites with distributed and essentially stress-free polymer attachments, and of relatively undulating shape with normally glossy, reflective surface, by adhering and/or interlocking the sintered plastic to rigid material, the attached polymer parts being entirely faultless and free of porosity or voids (liquid nonpermeable). Physical attachment can be accomplished by several extensions of polymer into separate and corresponding matrix depressions. Variations in cross section of projection and depression part members can be done in many ways to lock sintered polymer to the matrix material more effectively-by reversing polymer direction partially or completely around a matrix extremity, discrete angular change of width or curavature etc. Where it is desired to adhere a thin sheet to an irregular or undulating sintered polymer countour or rigid surface, the invention accomplishes this effectively.

A further part of the invention is to make useful combinations which are partly molding and composite together, and perhaps from different but compatible polymer constitutents. A unified aggregation consisting of adhered thin sheet, polymer and matrix constitutents can be the first product, the thin sheet being forcibly peeled away from the basic sintered polymer as a matter of choice.

Another objective of the invention is to provide several type of metal foil or thin sheet hot fluid fabricating vessels in which the above and other articles can be effectively produced. One purpose of the invention concerns application of hot fluid to deform thin sheet to shape and distribute sintering polymer into the various shapes and multi-part products described here in uniform void-free quality, undulated and varying shape, and with normally glossy and reflective surface. Such type of device may use only a single diaphragm while other types require several, and may be operated, preferably, with simultaneous fluid application. The devices may be combined back to back in the same split container, etc. (see drawings FIGS. 8 and 9 for some examples), offering a number of different combinations for multiple shaping of various kinds of moldings by suitable application of the processes of this invention.

The method of making the products, by simultaneous compacting and sintering etc., of course is part of the invention.

Another purpose is to adhere metal foil or other thin sheet material to shaped polymer or rigid material by deforming the sheet material with hot fluid, in contact with sintering polymer or rigid material. Because of its complex contour and relatively undulated shape, some structural reenforcement and additional surface properties may be introduced in a recessed molding or polymer rigid matrix composite via the adhered thin sheet etc.

To function properly in compacting and sintering, irreversible physical manipulations, a polymer type material must be chemically mature to maintain shape near its melting point (has to be fully polymerized), or around or above its transition temperature, (stable, high molecular weight) and be physically defined initially as solid particles, pieces or small masses with large and unglazed surface so as to cohere under pressure and densify in a desired shape, and sinter on heating at suitable temperature, the subdivided polymer losing identity to merge by diffusion and sticking together, with large reduction of free surface, irreversibly into a strong, no longer frangible mass. The basic characteristics of a sinterable polymer are:

(1) Nominally rigid type polymer for performing into a shaped article, (2) Divideable into physical form of high surface area, (3) Exhibits irreversible coherence and densification under physical process of applied pressure, (4) Chemical stability to maintain rigid shape hot-high molecular weight, (5) Apparent hot tackiness-tostick to itself, with self diffusion under stable high viscosity conditions, via irreversible process of temperature induced free surface reduction, with compacted densification and generation of non-frangible strength.

I have discovered that simultaneous fluid pressing and sintering such as via a hot thin deforming sheet, is capable of compacting, shaping, and distributing sintering polymer particles, pieces or assembly into properly pressed shapes without producing voids, cracks, porous areas, or other defects at any place within the polymer or at any place of contact with the sheet. The amount of consolidation, shaping and distribution of sintering polymer depends on filling and pressure, the extensibility and inward collapse of a thin sheet also, in addition to thickness and conformation of polymer particles, pieces, masses etc. or aggregate in all its parts, on the bulk physical properties of constituents, and configuration of rigid matrix or retaining mold surface(s). The interplay of these manifold factors results in an irregular and undulated shape being achieved which, although proceeding continuously, reflects these factors somewhat differently yet characteristically, along with specific geometry as well, at each and every infinitesimal area of the sintered product. Generally speaking, the amount of permanent deformation, and/or inward stretching of the sheet material at each location of the sintered molding gives measure of the consolidation, working, distribution etc. achieved in each part of a molding. Sometimes in areas of heavy deformation, super high densities may be found. The sintered polymer always retains a characteristic undulted shape, not flat but at the same time randomly irregular, being gently rounded when curved, and always continuously glossy and reflective, its internal quality uniform, stress relieved, and void-free (to liquid). When used, it is usually quite hard to peel the metal foil or other thin sheet (from sintered polymer surface) which adheres strongly to the polymer, and conforms completely and minutely to its distributed contours. (Quenching sometimes will serve to strip away partially.) If a normally reflective and unmarred surface is to be achieved on the sintered polymer, any thin sheet and mold surfaces must be smooth, clean, and free of contaminants. When shaped and distributed in this way, the polymer appears to exist in an essentially stress relieved condition relative to constraints imposed by rigid mold, matrix, or adhered surfaces, simultaneously pressed and sintered, and later cooled. Composites combine the best features of sintered polymer and rigid matrix material in a uniform single piece, having the strength of stainless steel combined with the chemical inertness of PTFE for example.

From the results described in Examples 1, 2, 3, 5, 6 misc., and 7 (see summary of conclusions) and other experimentation using conventional methods done by the inventor, but not reported here, it is demonstrated that sintered polymer articles of the prior art resembling these herein, and when not grossly defective to the eye, do not possess comparable undulated shape nor a glossy surface. And importantly these two qualities go more than skin deep, for these inferior imitations are always found to have defective density (porous parts) and lack consistent uniformity of parts from one cross sectional location to another in the article. Although live elastomer blocks or thin elastomeric diaphragms operating under cold fluid overcome locally variable stroke per Bauer (see Description of Prior Art), the added frictional factors between subdivided polymer, multi surfaced, rigid elements, with inter-sections in complex geometries of a multi-part article, generally defeat these expedients of the prior art in producing these objects. While it may be effective, in cold pressing some geometrical features to apply several times the usual pressing intensity, the use of brute force, so to speak, raises the level of frictional forces which have to be overcome, to oppose and defeat the uniformity and high densities sought in the first place, same remaining inevitably beyond reach. And as noted in the Prior Art discussion of Shonka, the criterion "without substantial flow" between particles must be retained at all times, if cleavage fractures are to be prevented in the sintered product. Of course, pressure equipment is costly, and even mere schedule 80 pipe with modest 500 to 1,000 psi ratings can be expensive to obtain and keep in operable condition. What is needed to make the new objects is a device and procedure which can overcome frictional defects between polymer pieces, rigid molding elements of specific geometry, effectively transfer heat, distributing polymer mass, and relieving stress as well. Simultaneous fluid compacting and sintering such as via a heated and deforming thin sheet, for example accomplishes this result.

The quality of sintered polymer article may be determined in a number of ways, density, dielectric strength, torsional modulus, and by measuring other physical properties. Since density is a common criterion, and the one most used here, some of the factors that effect it should be discussed. The density of a sintered polymer article depends on the size and character of polymer pieces from which it is compacted, crystallinity of polymer, size of article, conditions of fabrication like molding pressure, sintering time and temperature, cooling rate etc., (in most experiments given here cooling took place naturally in air, usually in about an hour or slightly longer at an estimated rate of 4°–7° F. per minute). In actual use, the all important feature is to attain a uniform, faultless, and void-free material, throughout the various parts, for otherwise the polymer in the shaped article will tend to leak liquid (being porous in places), or electricity and fail prematurely under physical stress. Far apart and tiny gas molecules often penetrate between gigantic macro-molecules of a high polymer mass, perhaps as hydrogen is known to pass through palladium metal. Liquids do not show such anomalous behavior; the term void-free as used herein refers to non-permeation of sintered polymer masses by liquids only. This is to say a minimum specific gravity must be achieved in all parts of a molding, at every location, at least 2.15 for PTFE particles averaging 35 micron size (assuming usual crystalinity for this form). A density below 2.15 would point to some degree of porosity and questionable quality; for the PTFE coagulated latex of tiny mass, (extrusion grade) a minimum of 2.19 has been used; and 2.12 is usual for the coarsest type PTFE usually encountered. With high (ultra) molecular weight polyethylene (high density) one kind would have a minimum figure of 0.93, FEP Teflon 2.14, and polyphenylene sulfide 50% asbestos 1.67.

The Commodity Standards Division of U.S. Dept. of Commerce has set up standards for various poly tetra fluoro ethylene products. The density range for non-porous premium grade sheet is 2.15 to 2.20, figures based on ASTM procedures and subject to normal experimental fluctuatuions etc. As noted in above paragraph, fine powder extrusion grade polymer would be expected to give normally higher densities than 35 micron and larger particle forms of commercial poly tetra fluoro ethylene; and common platen pressed sheet, too, shows place to place density variations, owing to inequalities in filling and pressure application via a rigid platen, usually equalized with fluid compaction procedures herein.

Of course there is extreme variation in mass between different forms of sinterable polymer materials. Chopped slugs of roughly ⅛ inch long FEP Teflon are estimated to be at least one hundred million times heavier than 0.6 micron coagulated latex particles of PTFE fine powders. Filled pieces of sinterable material can be similarly massive, while air classified dusts may be comparably minute.

Large moldings seem to require somewhat less pressure for molding than the smaller ones, to achieve the same density, and in fluid pressings, there may be a tendency for specific gravity to improve, sometimes according to the distance from the mold center. In practicing this invention, the degree to which foil or plastic sheet or polymer undergo working and deformation, reduced by high frictional factors in particular shape, appears to determine the ceiling of density in any particular parts of the molding. A procedural, factor that often produces densities well over 2.15 with 35 micron PTFE particles involves the stepwise application of fluid pressure at just the previously determined right intervals of the heating cycle via practical experience with a particular mold set up, see example 3. Of course, in a large molding, conditions vary from one location to another, and in time, as do the effects of pressure, not to mention features involving special geometrics. And furthermore, experience has shown in determining specific gravities that the normal fluctuations from experimental and statistical factors can never be entirely eliminated, even in the same parts or a molding. Suffice it to say that while the density of a sintered piece may be expected to vary and change in various parts of the molding, it cannot, for purposes of adequate quality be allowed to fall below a minimum value (for each type and piece or particle size of polymer). Furthermore, no faults, cleavages, or flow weaknesses, discontinuities, etc. some visible under light or X-ray can be allowed.

Specific gravities were determined experimentally with an analytical balance at room temperture (about 68° F.), in each of the examples, using distilled water and working to four places. In the case of example 6b, ethyl alcohol was substituted.

The shaping of sinterable polymer by deforming heated thin sheet in contact with the sintering material requires basically a heat resistant split container and an appropriately selected metal or plastic in thin section. Naturally, a source of high pressure heat resistant fluid is needed as well as some kind of heat source to maintain high temperature. Good tensile elongation and extensibility are the properties appropriate for the thin sheet, the newly discovered super plastic metal alloys permitting fabrication of large and very deep shapes, and perhaps low strength reducing some what the level of fluid intensity needed for compaction. Generally speaking, an increase in available elongation is provided by raising the thickness of the foil or plastic sheet. For smoothest polymer surface, the finish of the sheet material must be of high quality and scrupulously clean-from all dirt, size, or physical imperfections, all of which becoming unavoidably impressed upon the polymer surfaces, faithfully and in mirror image.

I have found that soft aluminum, with its 650° F. recommended annealing temperature, is ideal for working PTFE with crystaline transition point of 621° F. In example (1), six consecutive foil ruptures were reported for cold fluid pressing whereas a single trial was immediately successful when fluid and foil were both heated in the 650° F. range. Industrial aluminum foil is available in 5–12 mil thickness. Copper is another foil that is suitable, and new alloys of aluminum and titanium are under development with elongations of tenfold and over which promise unbelievable versitality.

Teflon sheet is available in 1/32 inch thickness and serves well as a heavy duty diaphragm with a temperature limit of perhaps 600° F. or somewhat higher. Repeated tightening of the sealing surfaces may be needed to offset creep. By retaining the margins and "brushing" with a low temperature and bushy flame, a Teflon sheet may be vacuum formed just like cold metal foil. A draw limitation of one to one, depth to radius can usually be accomplished without fear of rupturing this plastic sheet. Most any other distensible sheet material can be used if it can resist the temperatures and remain impervious to the hot fluid used.

The container for holding hot fluid against the diaphragm, and retaining the polymer as required etc. must be a pressure vessel of split construction to allow for insertion of polymer or assembly, and subsequently to permit removal of the article. In addition, on account of its usual permanent deformation, the used diaphragm, when and if detached, cannot under most circumstances be employed again. The margins of the diaphragm may be effectively sealed between hard flat surfaces. If desired, a raised face of appropriate area is useful for bringing the gasket loading to proper levels, and consistent with the magnitude of fluid intensity to be used. The actual pressure selected for properly deforming the diaphragm and working the sintering polymer depends on the nature and form of the particular plastic used, the foil or sheet material, its tickness, and the temperature at which the operation is conducted. A much lower intensity is needed for hot deforming a metal foil or thin plastic sheet in shaping sintering polymer than what is usual for cold pressing work. A split container made to the specifications and temperatures usually encountered for extra heavy pipe and fittings is often adequate for construction design of the apparatus herein.

Figure 9:
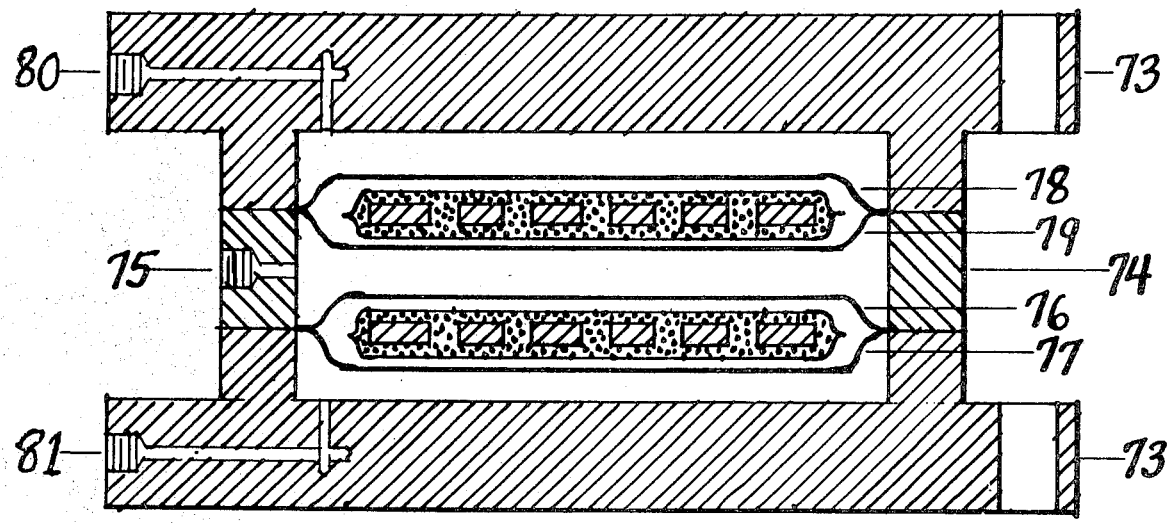
FIG. 9 illustrates a back to back arrangement of two double diaphragm devices of FIG. 4b.

Devices for fabrication of several objects at a time are shown in FIGS. 8 and 9. Two formed thin sheets 18 FIG. 3 are placed back to back on ring 64 FIG. 8 to permit fabrication of two single sided composites 10 FIG. 3 with the same application of hot fluid acting on each 62 and 63, simultaneously. In FIG. 9, two sieve plate composites 41 FIG. 7 are made, each with its own diaphragm pair, 78 and 79 FIG. 9 and 76 and 77. Foils 76 and 79, comprising parts of adjacent pairs, are positioned back to back on ring 74. Such construction reduces the number of parts needed to complete the split container. In using devices with more than one diaphragm, it is well to make certain that equal and simultaneous application of fluid takes place on adjacent diaphragms of the same molded piece. If an imbalance does arise, the molding or composite may be injured in addition to damaging the diaphram(s). Such a condition can always be prevented by connecting together the corresponding passages of split container portions, 75, 80 and 81 FIG. 9 for example.

Summary of Conclusions Taken from Examples (Example 1). The multi-shouldered PTFE object FIG. 1 made by apparatus and procedures here recommended, after being forcibly pried out, was found free of faults and showed void-free density of 2.15 or higher throughout. It had undulated shape reflected by the tenaciously adhering deformed foil, which when forcibly peeled, revealed a glossy and reflective surface. The same object pressed cold was found to be cracked; its free sintered pieces were broken and non-uniform, and of dubious quality with specific gravity 2.13 and 2.14 with granular dull surface.

(Example 2). A single-sided TFE adhered coating, made by the procedure and devices given here, included various parts like sectional features of polymer thickness extension, recessed 60° interlock, and recessed shoulder interlocking edge with reserse section. The coating tested 2.20 in density, identical with the interlocking edge sample, with 2.16 for the thickness extension, and 2.17 for the 60° interlock; all values were above the 2.15 minimum density for PTFE of this type and were therefore void-free, non-permeable to liquids. Faults or cracks were not present, and the shape and surface were comparable to that reported under Example (1). An effort to make the same object by cold pressing under fluid pressure followed by free sintering was unsuccessful.

(Example 3). A covered flat disk with edge reversed bend was prepared, edge and flat giving annomolously high specific gravities, (lowest) of 2.22. The identical object became cracked and broken in attempts to cold press and free sinter this shape.

(Example 4). An annular ring 31 FIG. 6a was totally encapsulated in sintered PTFE and found to be non-permeable to hot acid plating bath, after six weeks continuous exposure.

(Example 4b). A single sided ring composite like 10 FIG. 3, in the form of a ring 33 FIG. 6, can be simultaneously fluid pressed and sintered from PTFE with recessed shouldered preform FIG. 1 inside its center to produce a void-free molding-composite combination 105 FIG. 11.

(Example 5). A sieve plate composite was prepared and hole samples cut; they tested 2.16 density, flat strips 2.15, and edge 2.17, all uniformly void-free and faultless in quality. On the same matrix, a cold fluid pressed and free sintered composite had been made; hole buttons of 2.14 density indicating porosity and likelihood of penetration by corrosive liquid environments of chemical process equipment.

(Miscellaneous Examples 6a)., (6b), (6c) and (6d) show that polymers like FEP Teflon, HMW Polyethylene, Polyphenylene Sulfide with filler etc may be effectively pressed and sintered into recessed sectioned moldings and composites, and their combinations, using the methods and apparatus of the invention. Compatible types such as PTFE and FEP Copolymer may both be sintered together in combination like molding-composite pairs etc., 105 FIG. 11a.

(Example 7). Shows that thin sheet material such as Teflon is suitable for diaphragms used for hot pressing and sintering with the apparatus used herein. Also projecting metal and other independent punched sections etc can be used effectively interlocking sintered polymer to rigid material, or forming depressions therein.

(Example 1). It was desired to make the shouldered object 1 in FIG. 1 with two adrupt recessions and progressively larger thickness changes 3 and 4 from PTFE. A metal foil 5 and rigid mold surface 6 were provided and housed for operation in split container 19 and 20 FIG. 2. PTFE powder was placed in mold 6 and leveled, the flat circle of metal foil 5 being sealed there over by placing foil, polymer and mold within the two portions of the split container 19 and 20 FIG. 2 and secruing the latter together.

As the assembly was heated to 621° F. in a salt bath, compressed air was applied to the metal foil on the side opposite from the polymer in slowly increasing intensity from atmospheric to 1,000 psi (Expt 27). After about one half hour, the temperature having risen to 660° F., the device was removed from the heating bath and cooled, the air finally being released. The piece FIG. 1, which reflected an undulated shape wrapped congruently in deformed foil on one side, had to be pried out of mold 6 on account of its adhesion to the surfaces of the mold. After peeling away the foil by folding backwards and pulling strongly (the thin metal ripping frequently), the molding FIG. 1 was found to be free of faults or cracks by examination under strong light. The edge density was 2.15, the middle 2.15, and the center 2.20. A glossy and reflective finish was evident on the upper face, and the polymer was observed to be distributed uniformly with gently curved intersections above the shoulders, 2, 3, and 4 FIG. 1.

The experiment was repeated six times at room temperature using the same metal foil (5 mil aluminum) and others (10 to 15 mil) annealed etc. and under various conditions of prepackaging. In all cases the metal failed at low pressure and the piece was not adequately shaped. Finally (Expt. 16) the 10 mil foil was made to hold 2,350 psi for proper cold pressing. The piece that had been formed, however, was cracked underneath each shoulder. Notwithstanding, the faults, the three fragments were free sintered; they showed a specific gravity of 2.13 edge, 2.14 middle and 2.16 center. A 1/16 inch thick rubber sheet was substituted for the foil and 2,500 psi applied for four minutes (Expt. 23). The resulting piece was cracked just as the previous one, but nevertheless the three pieces were free sintered with the following densities determined; edge 2.15, middle 2.14, and center 2.15 indicating porosity in the fragments. The surfaces, though somewhat curved and distorted, were relatively planar in one direction, non-reflective, and had a granulated texture like fine sandpaper.

For preparing a lightly and cold compressed TFE shouldered preform for making molding-composite combinations such as 105 FIG. 11a, a thin rubber sheet works well, using a few hundred psi, enough to provide coherence and strength of the pre-pressed PTFE for handling. Actual hot fluid pressing and sintering the final molding-composite is described in Example 4b. If it is desired to incorporate a molding of FEP copolymer as part of the composite, a partial sintering is suitable, and the FEP slugs, or a mixture of that and TFE powder is charged mold 6, and sintered as above using appropriate lower temperatures.

(Example 2). A circular single sided composite 10 FIG. 3 (approximately 5 inch O.D.) was consolidated together consisting of polymer cover 11 adhered and attached to steel disk 12 (Expt. 32). The polymer was anchored to the edge by a recessed metal shoulder, having been specially formed and distributed in a section of complementary shape 13. Further sectional attachments were made by forming the polymer in straight cylindrical extension 14 and conical 60° interlocking extension 15.

A circle of metal foil was cut from sheet and vacuum formed to concave shape 18 FIG. 3 by placing it on split container 20 FIG. 2 and pumping down the inside. The matrix 12 FIG. 3 was attached to the upper half of the split container for convenience (screw 21) and a ring 22, somewhat larger and higher than the disk was placed around the matrix temporarily for retaining the polymer during packing. The polymer powder was spooned inside the ring, tamped down with more added to the hollows over the holes and recessed edge, and tamped again several times until a level preform had been packed. The packing ring was then removed and the concave foil 18 placed over the preform 23. Its margin was sealed to the split container by placing the lower half 20 over the foil and securing the container pieces together (with bolts).

The assembly was heated over a period of about half an hour to approximately 550° F. Then at intervals of several minutes, compressed air was admitted to raise the pressure on the foil inside the container from atmospheric to 500 psi, the temperature rising meanwhile to 620° F. After about an hour, the split container had attained a temperature of 660° F. and it was then cooled to room temperature while maintaining pressure to 500 psi.

After release of compressed air, the container was opened and the deformed foil peeled forcibly off the composite. The polymer cover 10 FIG. 3 had been rather evenly distributed in about 1/16 inch thickness, but with an undulated configuration. Small indentations 16 were formed over extensions 14 and 15, and a rounded shoulder was apparent at the recessed extremity (circumference) 13 of the composite. These features were reflected in the metal foil, of course, which had been deformed in a mirror image of the shaped polymer surface.

Samples from the recessed edge 13, the plain extension 14, and the 60° recessed interlock 15 were cut from the covering. In order to obtain comparative samples of the relatively flat polymer cover, two cuts were made about one inch apart and extending across the disk. This strip adhered so strongly to the surface of the disk that it could be detached and separated only by forcing a thin steel blade into the interphase to be forcibly and repeatdly bent upward to get the strip free. Specific gravities were determined as follows: plain extension 14, 2.16, recessed edge 13, 2.20, flat cover strip 11, 2.20 and 60° recessed extension 15, 2.17. The polymer cover was rather evenly distributed, being slightly undulated and variable rather than exactly flat and planar, and possessed a glossy and reflective surface; it was free of cracks and faults as became evident from careful examination under strong light, nor were any flow patterns or weaknesses detected.

In order to illustrate the ineffectiveness of other methods, the recessed matrix 12 was screwed to a plain flat disk of somewhat larger diameter and a preform prepared (Expt. 33) in the manner described above (same example 2 FIG. 2). The assembly was then placed in a 6 mil vinyl chloride bag and heat sealed for pressing. Bag and preform were inserted in a pressure vessel and subjected to 2,450 psi air for about four minutes at room temperature. The unheated but pressed compact was well densified but could be seen to be of different dimensions and configuration than the composite 10 FIG. 3 above. A sharp ridge had formed above the recessed edge, and the piece was straight sectioned from top to side at about 90°. After free sintering on a tray for forty minutes above 620° F., peak temperature 660° F., the molding was examined (after cooling). The bottom face of the polymer edge had been bent upward at 30° or thereabouts, from the horizontal, with the recessed edge broken off around the circumference. The softness of the edge portion, still underneath the steel shoulder, to fingernail pressure indicated gross porosity and lack of proper compression of any description. The tearing probably arose from excessive shrinkage across the face of the matrix. The polymer was found to be detached from the surface of the matrix, and there was no adhesion at all, or in any locality between polymer and flat metal disk.

(Example 3). Fabrication of a completely covered plane disk composite 25 FIG. 5a required a multiple foil and split container device. The apparatus FIG. 4a consisted of two flat circular metal foils 51 and 52, a split container ring 53, and two identical split container ends 50. Plane disk composite 25 FIG. 5a consisted of PTFE exterior adhered to steel disk 27 with continuous reverse bend 28–29 where metal projected into sintered polymer around the circumference of the disk.

To make this composite (Expt. 28), a preform 30 was prepared by placing a temporary packing ring somewhat larger and higher than Disk 27, on the flat surface to permit the tiny PTFE pieces to be leveled off inside, and well below the top of the ring. The disk 27 was then placed on the PTFE and the ring completely filled, see FIG. 5, the assembly being pressed down manually to make a handleable agglomerate 30. This was removed from the ring. The second foil 52 FIG. 4a was placed on second split ring container end 50, polymer assembly 30 and split container ring 53 rested on foil 52 concentrically, and then first foil 51 and first split container 50 were placed thereover, the split container sections being secured together.

The container was heated to 500° F. and compressed air was admitted to bear upon each foil concurrently in increments of several hundred psi at intervals of several minutes. By the time the container had reached 635° F., the pressure had been raised to about 1,000 psi which was maintained at this level for forty five minutes, the peak temperature rising to 675° F. After cooling to roughly 250° F., the gasses were released and the deformed foils peeled off the composite.

The total enclosure 25 FIG. 5a had a glossy and evenly distributed polymer exterior 26, with undulated, non-planar shape with a peaked edge between 28 and 29 around its circumference where the rigid metal projected into the reverse bent polymer. With difficulty, the tightly adhering polymer was pried off and cut in strips for running specific gravity with the following results: flat and edge at one location 2.217 and 2.218 respectively, and at another 2.226 and 2.227. These values are anomalously high for 35 micron size PTFE, and with the material, experimenter Cresap had never before seen densities this high (comparable crystallinity). Examination of the strips and edge in strong light failed to reveal any flaws or other defects.

Another $3\frac{1}{2}$ inch O.D.×$\frac{1}{4}$ thick metal disk was fluid compressed in Saran bag at 2,500 psi and room temperature. On free sintering the compact, the polymer part was found to have cracked around the entire circumferential edge with additional cracking evident on one plane face. There was no evidence of adhesion of polymer to the metal surface.

(Example 4a). The annular ring 33 FIG. 6 with plain holes 35 drilled through, was assembled for total encapsulation with TFE polymer 32 to make the covered torous 31 by the procedure used for disk 26 FIG. 5 in Example 3). immediately preceeding.

The aggregate 40 was lightly compressed at room temperature in a Saran bag with 500 psi air. Then it was placed in the split container of FIG. 4a). comprised of two ends 50 and ring 53, and between foils 51 and 52. After securing the container, 100 psi air was applied simultaneously to the exterior of each foil and the assembly was immersed in a salt bath heated to 700° F. After 20 minutes the pressure was raised to 300 psi, the container having heated to 600° F. and the pressure was raised to 450 psi. Fifteen minutes later the vessel had reached 620° F. and the pressure was raised to 600 psi and held for twenty five minutes, peak temperature 660° F. The compressed air was vented and the piece removed.

Composite 31 FIG. 6a had a smooth glossy finish with rounded and peaked edges 36-37 both on the interior edge as well as the outside circumference where matrix extremities extended into the reversed sectioned polymer. Where holes had been, the polymer apparently flowed in leaving slightly and gently curved depressions 34 on each surface. The foil had been deformed and stretched tightly over the undulating faces and rounded extremities inside and out 31 FIG. 6a. Where the two foils came together, a blunt edge was formed 36-37. The foil adhered strongly in exact and conforming undulating contour to the polymer composite. Since the composite was desired without thin sheet adhering thereto, this was peeled back and delaminated by pulling heavily backward. Sometimes the foil strength was exceeded, portions tearing off and remaining adhered, indicating bond strengths exceeding the foil tensile strength. The torous was immersed in 135° F. acid chrome plating bath ($H_2SO_4$), where it remained for six weeks. Upon removal of the ring composite it was cut apart to inspect for evidence of attack from the corrosive environment. There was no evidence of metal attack nor of any kind of fluid penetration or any corrosion etc.

(Example 4b). It is an easy matter to make a combination molding composite having special features, say of a recessed molding, and the combined structural-polymer characteristics of a particular composite. In order to make shoulder molding-single sided disk composite combination 105 FIG. 11a, unfinished molding 1 is first prepared as indicated in the last paragraph of Example 1), page 17. Plane flat disk of Example 2). is bored slightly larger in diameter than the second shoulder 3 FIG. 11, and centrally located, to form ring 33 into which the molding 1 is introduced to produce article 105. A centering ring 111 is made to fit into the bore of the ring on its outside while having an opening on the inside to fit shoulder 4 of the molding. The ring 108 (33) is attached to mold 19 FIG. 2 by screws (tapped holes 109) and spacer ring 111 is dropped into ring 108 around its center. The procedure of Example 2)., the third and fourth paragraphs page 24 and first and second paragraphs page 25, using mold 19 FIG. 2 are applicable with the following exception. Instead of charging PTFE powder above the spacer ring 111, the lightly pressed unsintered PFE pre preform of the shouldered molding FIG. 1 (from Example 1 above) is first placed over the spacer ring 111 to complete this part of the piece. The PTFE powder is spooned only to the area outside the extremity of the molding 1 at the shoulder 2 FIG. 11, since what might be otherwise needed inside has now been provided by the molding preform itself, 1 FIG. 1.

Molding-composite 105 FIG. 11a has the recessed shouldered molding 107 within the ring 108 (33) with interlocked and adhered polymer 106 continuing inward across the ring surface to become integral with, and a part of, the central recessed molding 107, all with usual contour and glossy surface features, void-free quality, lack of faults etc.

(Example 5). A one eighth inch steel circular plate $3\frac{1}{2}$ inch O.D. 43 FIG. 7 was drilled with twenty seven 11/32 inch holes arranged on equilateral triangular centers 9/16 inch apart, to make a sieve plate matrix for a distillation column. Two somewhat larger circles were cut from 5 mil soft aluminum and vacuum formed to concave shape 54 and 55 FIG. 4b. Instead of using one split container ring 55, two identical half thickness rings 56 were substituted, in order to seal the margins of the foil as will be described.

Second foil 55 was placed over one ring 56 which was rested on second split container end 50 using a foil gasket. Powdered PTFE was sifted and leveled in the concavity of the foil 55 and matrix 43 was laid on the powder surface after which a second portion of PTFE was sifted on to cover the matrix and its edges. After wiping the excess from the foils flat edge, the first foil 54 was placed over the second foil 55 with the powder and burried matrix within the concavity of the foils. First ring 56 was placed over the margin of the first foil 54 and first split container end 50 put thereon (with foil gasket), the container assembly being secured together.

Heating of the split container was started and after twenty minutes the temperature had risen to 515° F., 100 psi compressed air was applied concurrently to each foil. After one hour and a number of successive pressure increases, the temperature of the split container reached 622° F. and the pressure inside was 1,000 psi. Eighty minutes later the container had reached 650° F. and the heating was discontinued. After release of the gas, the container was opened and the molding withdrawn with the deformed foils tightly adhering to it. After removal, a high gloss and well distributed molding 41 FIG. 7 was apparent with undulated surfaces and rounded and blunt edge circumference. The polymer material in the holes 44 were cut out with a cork borer to make test buttons. Also the outside faces with cut holes from the cork borer were laboriously pried free of the matrix and made into strips, keeping portions from the same location together for test purposes. Edge sections were taken similarly. Specific gravity measurements were as follows: buttons 2.16 and 2.16 (two locations), hole strips 2.15 and 2.15 respectively, and the edge strips 2.17 and 2.17. No faults or cleavages were found.

The same matrix had been covered with PTFE and pressed previously in vinyl bags at room temperature under 3,000 psi air, being sintered thereafter under typical conditions (Expt B-7 261). The average specific gravity was 2.14 for bottons taken from the holes while the flat hole strips averaged 2.16, porosity being indicated in the hole polymer. The hole strips and other exterior portions did not stick or adhere in any way to the stainless steel matrix.

Miscellaneous Example 6a). A sieve plate composite 41 was prepared from FEP Copolymer pieces, the standard form of this material. The ⅛ inch long, or so, roughly cylindrical slugs were placed in the concave foil 55 FIG. 4b in comparably the same manner described for Example 5 (second paragraph page 29). A 3½ O.D.×⅛ inch thick matrix 43 FIG. 7 was used with double foils 54 and 55 FIG. 4b.

The bolted apparatus FIG. 2 was heated in a 620° F. molten salt bath for fifteen minutes, compressed air at 200 psi applied, with the temperature rising to 495° F. In twenty minutes following, the pressure was raised under steps to 800 psi and the temperature of the pressing rose to 575° F. after which it was removed and allowed to cool in air.

The translucent and faintly milky composite, perfectly formed, was examined for flaws under strong light to see there were no bubbles, faults, cracks or voids etc., and that all matrix holes contained only sintered polymer. A segment of polymer was sawed to metal, cut off and pried away to check results further. Besides having an undulated shape, a somewhat varigated surface outlining and reproducing somewhat the form of the original polymer slugs had still been retained. The surface was glossy and reflective, none the less, and undoubtedly could have been made smooth by adapting the temperature, time, pressure sequence.

Miscellaneous Example 6b). Another sieve plate composite 41 FIG. 6 was made almost identically to Example 5) and 6a) using ultra molecular weight polyethylene (range 2-4 million, High Density). This was pressed about half an hour at 550° F. and 800 psi with cooling at 1,500 psi (Expt 38). The white, translucent milky, smooth and undulated surfaced composite on an aluminum matrix was very light in weight and found to be perfectly formed. Buttons, hole strips, and edge sections showed specific gravities of 0.930, 0.932, and 0.930 respectively, (immersion in purified ethanol) with previously pressed samples indicating 0.932 (manufacturer).

Miscellaneous Example 6c). A still further composite sieve plate was prepared as above by sintering polyphenylene-sulfide resin 50% asbestos filled. The pieces of this resin were brown lumps about the size of the FEP Copolymer slugs, though not identically shaped, of course. A matrix of hot rolled steel 1/10 inch thick-×3½ O.D. was selected, and the same procedure used as in the other of these Miscellaneous Examples 6). The mold assembly underwent the sintering operation for about a half hour at approximately 625° F. and 1,000 psi with atmospheric cooling at 1,500 psi. The composite was found to be perfectly formed, and a segment of the hard brown sintered plastic had a density of 1.65.

Miscellaneous Example 6d). To make a molding-composite type product from a combination of several sinterable polymers, of compatible nature, the following procedure is used. A mixed TFE and FEP, or straight FEP Copolymer recessed shoulder molding 1 FIG. 11 is either partially or completely sintered according to procedure of Example 1) last para page 23, et seq. This portion is then sintered as a mass with other pieces of PTFE as in Examples 4b to obtain the composite-molding combination 105 FIG. 11.

Molding-composite combination 105 FIG. 11a in this example consists of matrix ring 108 covered by attached and adhered PTFE sintered polymer 106 over exterior edge and faces extending inwardly to join and unite integrally with FEP copolymer recessed section molding 107, molded centrally within ring 108. In instances where polymer sheet material is used for the final fluid pressing and hot sintering, and may be retained and not stripped away, the resulting void-free aggregation can consist of more than two different polymer types etc.

Figure 10:
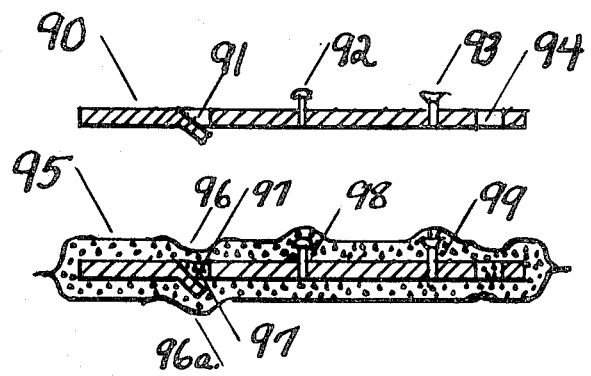

(Example 7). HMW Polyethylene Composite 95 FIG. 10a was made from ⅛×3½ inch O.D. aluminum matrix 90 and coarsely ground pieces of polyethylene. Feature 91 comprised several partial through punchings, 92 and 93 projecting steel screws, and 94 several 11/32 holes. The thin sheet diaphragms were cut from 1/32 inch thick Teflon sheet which had been flame formed under vacuum by "brushing" with a propane torch to shape to form 54 and 55 FIG. 4b. These were practically identical to cold formed metal foils of the previous Examples.

The ground pieces and matrix were placed properly in the Teflon diaphragms as described previously and the apparatus heated for half an hour or thereabouts at 530° F. and under about 1,000 psi air. After cooling under increased pressure, a segment of properly formed composite was selected which revealed the material under the rigid screw heads 98 and 99 and extended punched metal 97. By sawing, prying, twisting, and cutting, the immediate cross section of polymer was parted and inspected to determine if it had been properly formed, the particular pieces being too small for gravimeteric density determination. The sintered polymer was found to be strongly attached and had to be stressed heavily beyond failure before removal. A yellow surface discoloration was present over the polymer surface, probably from a size or organic film left on the Teflon sheet, but his was readily scraped off with a knife. The plastic sheet had extended inwardly at hole locations 96 and stretched over screw projections 96a reflecting and undulated shape but still comparable with the composite inside, and in corresponding detail.

While there are described herein certain embodyments of this invention, it is understood to be capable of many variations and modifications. Change, therefore, may be made in its various manifestations without departing from the spirit and scope of the invention and the claims which follows herewith.

I claim:

1. A molded sintered polymer high density article comprising a body having a first portion and at least one second portion with altered configuration, each said first and second portions being uniformly void-free, said first portion having a different density than said second portion and each portion having a density above the threshold for liquid porosity.

2. The article of claim 1 in which said second portion is formed in an angular aspect abruptly different from said first portion.

3. The article of claim 1 in which said second portion has a different thickness from said first portion.

4. The article of claim 1 wherein said second portion has a distinctly altered cross section from said first portion adjacent to an extremity of said article.

5. A molded premium quality sintered polytetrafluoroethylene high density article comprising a body having a first portion and at least one second portion with altered configuration, each said first and second portions being uniformly void-free, said first portion having a density of at least 2.15, and said second portion having a higher density.

6. A molded sintered polymer high density article comprising a substantially rigid member and a sintered polymer member, said rigid member having a first portion and at least one second portion, said polymer member having a first part intimately engaging said first portion of said rigid member and a second part intimately engaging said second portion thereof, said first polymer part having a different density from said second part, and each of said first and second polymer parts having a density above the threshold level for liquid porosity.

7. The article of claim 6 in which said second portion of said rigid member includes a distinct depression.

8. The article of claim 6 in which said one portion of said rigid member includes a distinct projection.

9. The article of claim 6 in which said polymer member is premium quality polytetrafluoroethylene having a minimum threshold density of at least 2.15.

10. The article of claim 6 including thin sheet material adhered to at least a portion of said polymer member.

11. A process for molding a sintered polymer article having at least one cross-sectional variation from subdivided sinterable polymer material comprising the steps of agglomerating a supply of sinterable polymer in the porous state, heating said sinterable material to sintering temperature while simultaneously applying fluid under pressure to compact and irreversibly densify said sinterable material to void-free condition to produce an entirely non-porous to liquid sintered article with desired cross-sectional variation.

12. The product produced by the process of claim 11.

13. A process for molding a non-porous high density sintered polymer article having at least one cross-sectional variation from subdivided sinterable polymer material comprising the steps of agglomerating a first supply of sinterable polymer material, partially compacting said first supply of material to form a porous body, agglomerating a second supply of sinterable material in a porous state and in engagement with said body, heating said first and second sinterable materials to sintering temperature while simultaneously applying fluid under pressure to compact and irreversibly densify said materials into a unitary member with desired cross-sectional variation while sintering same to produce a entirely non-porous to liquid article.

14. The product produced by the process of claim 13.

15. A process of adhering a sinterable polymer material to rigid material comprising the steps of placing a porous agglomeration of subdivided sinterable material against a rigid member, heating said sinterable material to sintering temperature while applying fluid under pressure to compact and irreversibly densify said sinterable material into close molecular juxtaposition with said rigid member so that said polymer material is non-porous and adheres to said rigid member.

16. The product produced by the process of claim 15.

17. The process of claim 15 including the step of cooling said sintered polymer while retaining the fluid under pressure.

18. A process of adhering sinterable polymer material to thin sheet material comprising the steps of placing a porous agglomeration of subdivided sinterable material against the thin sheet member, heating said sinterable material to sintering temperature while applying fluid under pressure to compact and irreversibly densify said sinterable material into close molecular juxtaposition with said sheet member so that said polymer material is non-porous and adheres to said thin sheet member.

19. The process of claim 18 including the step of cooling said polymer and thin sheet while retaining the fluid under pressure.

20. The product produced by the process of claim 18.

* * * * *